Jan. 2, 1951     J. C. H. LACHAISE     2,536,377
MOLD FOR THE PRODUCTION OF BUILDING MEMBERS
Filed Oct. 13, 1945     5 Sheets-Sheet 1

Inventor
Jean C. H. Lachaise
by Malcolm W. Fraser
attorney

Jan. 2, 1951  J. C. H. LACHAISE  2,536,377
MOLD FOR THE PRODUCTION OF BUILDING MEMBERS
Filed Oct. 13, 1945  5 Sheets-Sheet 2

Fig. 2

Inventor
Jean C. H. Lachaise
by Malcolm W. Fraser
attorney

Jan. 2, 1951  J. C. H. LACHAISE  2,536,377
MOLD FOR THE PRODUCTION OF BUILDING MEMBERS
Filed Oct. 13, 1945  5 Sheets-Sheet 3

Inventor
Jean C. H. Lachaise
by Malcolm W. Fraser
attorney

Jan. 2, 1951   J. C. H. LACHAISE   2,536,377
MOLD FOR THE PRODUCTION OF BUILDING MEMBERS
Filed Oct. 13, 1945   5 Sheets-Sheet 5

Inventor
Jean C. H. Lachaise
by Malcolm W. Fraser
attorney

Patented Jan. 2, 1951

2,536,377

UNITED STATES PATENT OFFICE 2,536,377

MOLD FOR THE PRODUCTION OF BUILDING MEMBERS

Jean Célestin Hippolyte Lachaise,
Vitry-sur-Seine, France

Application October 13, 1945, Serial No. 622,129
In France December 7, 1944

7 Claims. (Cl. 25—121)

There are already known the plants for the manufacture of molded articles, namely articles of concrete such as posts, piles, pillars, parpens, various conglomerates and other building elements and the like. Such known plants have all the common defect of prohibiting a very rapid production, necessitating a great number of various apparatuses and abundant labor, conditions that are incompatible with the modern industrial production.

The present invention has for its object a plant for the manufacture of molded articles, which permits to avoid the defect above alluded to and which has the following advantages over the existing plants: very rapid production, extremely reduced labor not necessarily specialized, equipment reduced to its simplest expression.

The invention also has for its object various novel devices or improvements in the art of molding, transportation and storage of elements which it is desired to manufacture.

The plant according to the invention substantially comprises, in combination, an apparatus intended for preparing the mixture to mold, a mold adapted to the form of the articles to produce a dosing device for filling the mold, and at least one transportation member intended to carry the molded article or articles to the place of drying or storage.

According to an advantageous embodiment of the invention the mold, dosing member and transportation member are rendered dependent on one another in operative position. In the advantageous case, where the transportation member is constituted by a movable bridge traveling in two perpendicular directions, the mold and the dosing member may be supported by one of the pillars of the traveling bridge.

In this case, the mixture to mold may be brought to the dosing member for example from a general distributing conduit. When this mixture is of concrete, the concrete mixing machine preparing same may be equally arranged so as to suit with eventual movements of the mold and dosing member.

It is preferable that the apparatus producing the mixture to mold be supported by the same pillar of traveling bridge that carries the above enumerated members.

The traveling bridge is of any desired type, provided that it may be displaced in two perpendicular directions. For example, there may be used a bridge which is displaced on rails parallelly to itself and the span of which is a function of the width of the available ground.

The present invention also comprises improvements in different elements of the plant above referred to, namely in the matter of molds, such improvements having for their object to thoroughly utilize the production facilities afforded by the plant under consideration, with a view to bringing the operation of molding to its maximum capacity and efficiency.

The mold according to the invention substantially comprises, in combination, a bottomless outer casing, a movable multiple pallet adapted to be inserted into said casing, and a number of cores preferably made fast to the frame situated in a same plane and adapted to be introduced into corresponding openings provided in the said pallet.

In the more general case, the mold according to the invention is intended to simultaneously produce several manufactured articles necessitating each a certain number of cores. There are then provided partitions separating from one another the core groups used for each article. Such partitions are advantageously mounted on the same plane frame as the cores and are adapted to pass, as well as the cores, through suitable openings provided in the multiple pallet. Said partitions may also be mounted directly on the mold wall, under the pallet.

Means are, of course, provided for removing from the mold the multiple pallet and the molded articles it carries.

In the beginning of this removal an important effort takes place which corresponds to the molded article being separated from the mold walls and the cores. When the molded articles are numerous or of large dimensions such effort may be sufficient to bend the pallet and, therefore, to compromise the mold discharge. Such bending is insomuch possible as the pallet is of relatively light structure for reasons which will be explained hereinbelow. According to the invention, there is then provided a counter-pallet of more solid structure intended to support the pallet at the moment of the separation. Such counter-pallet may be for example temporarily rendered fast to the pallet proper, means being provided for separating them after the separation phase of the mold discharge.

For each mold there is advantageously provided an important number of pallets, since in principle the pallet is extracted from the mold together with the molded article or articles which the pallet continues to support until their dryness be sufficient. The surface for storing these pallets and the articles they support is, therefore, in principle very considerable, but it may be substantially reduced if, according to the invention, the pallets are provided with means permitting to pile them up without impeding air circulation around the articles to be dried or without causing the latter or the pallets to exert pressure upon the articles disposed thereunder. Such means may for example consist of a particular formation of the elements which permit to remove from the mold the pallet and the articles it supports.

According to another improvement, object of the invention, there is adjoined to the mold a vibration device of any suitable type. Such vibrator may for example be made fast to the lateral longer face of the mold; however, but such disposition is not imperative. Should the mold dimensions or the qualities of the product to make so require, there may be provided several vibrators which will be made fast the mold walls at points suitably determined.

The quantity of material to be introduced into the mold for each molding operation is preferably controlled by means of a dosing device mentioned hereinabove. According to an advantageous embodiment of the invention, such dosing device is of width substantially equal to one of the mold dimensions and is adapted to be displaced parallelly to the other dimension of the mold. Such disposition permits to correctly fill up the mold. This dosing device may be of any desired type. In a practical embodiment of the invention, there is made use of a blade dosing device adapted to rotate intermittently by means of a lever and ratchet wheel, but this way of doing is no limitation.

It is obvious, and this results from what precedes, that the plant according to the invention is not limited to the manufacture of a particular article or to the use of a definite starting material. So it is, for example, that the plant permits to manufacture building hollow blocks, parpens, various conglomerates, through-carved pillars, conduits and the like. The articles may be made from any moldable material.

In order that the invention may be clearly understood and readily carried into practical effect, the same will now be described with reference to the accompanying drawings which show by way of example some embodiments thereof and in which.

Figure 1:
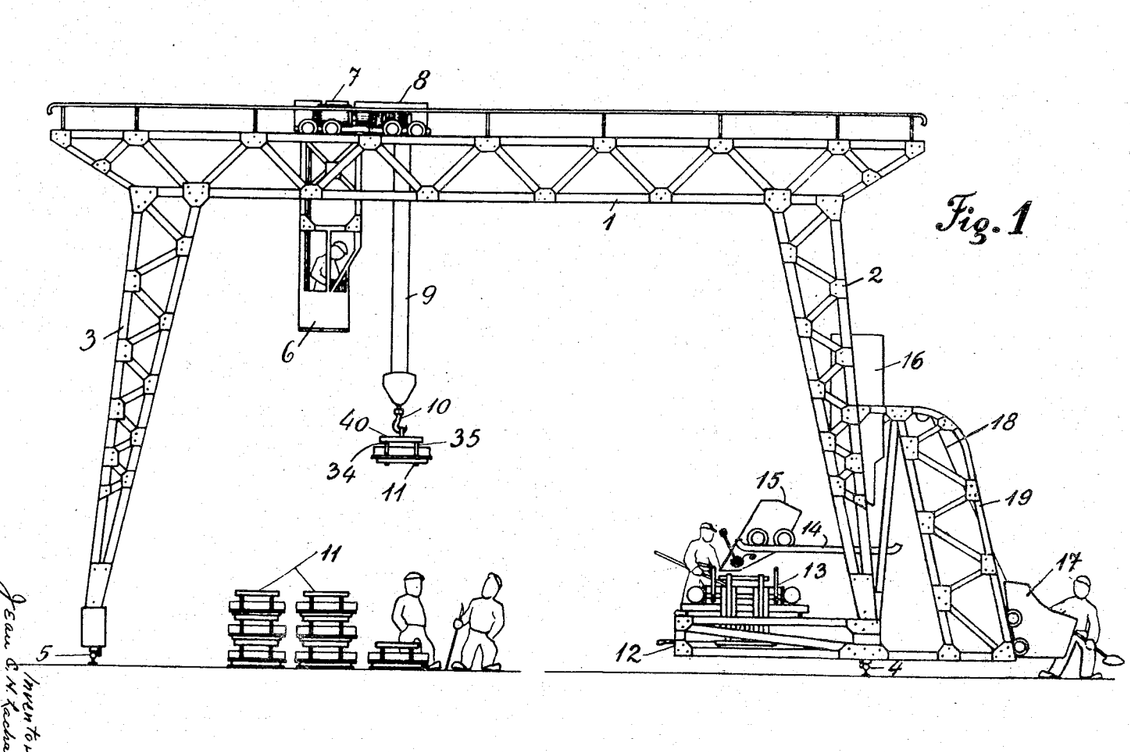
Fig. 1 is a diagrammatic elevational view showing a plant according to the invention.

As shown in Fig. 1, the plant according to the invention comprises, on a ground of suitable dimensions, a traveling bridge 1 the pillars 2, 3 of which are displaced on rails 4, 5 respectively.

Displacement of the bridge 1 parallelly to itself is effected in known manner from a telpher 6. On the other hand, the telpher 6 may be displaced along the bridge 1, perpendicularly to the rails 4, 5, jointly with the motor 7 and hoisting apparatus 8. The latter controls, in a known manner, the hoisting hook by means of a hoisting rope 9.

The span of bridge 1 is limited by the width of the available ground so as to reserve the maximum space for drying and storing the manufactured articles transported jointly with the pallets 11 by means of the bridge 1.

On one of the pillars or one of the pillar pairs of the bridge 1, the pillars 2 for example, is mounted a frame 12 on which is secured the mold 13, in a manner which will be described hereinbelow, and eventually a platform intended for the worker looking after the molding operation. On the same pillar or pair of pillars is secured a runway 14 on which may be displaced, in a manner which will be more amply described hereinbelow, a dosing device 15.

In the embodiment shown in drawings, there is also secured on the pillar 2, or the pair 2 of pillars, a concrete mixing machine 16 provided with its usual accessories, particularly with its charge container 17 displaced on the runway 19 by means of a hoisting rope 18. It is evident that the fixation just described of the concrete mixing machine 16 and its accessories is not indispensable and that these may be displaced independently of the bridge, without departing from the scope of the invention. In particular, if the doser container is of sufficient capacity, the concrete mixing machine may be stationary, the doser 15 being then adapted to be displaced all along the plant ground, parallelly to the rails 4.

Figure 2:
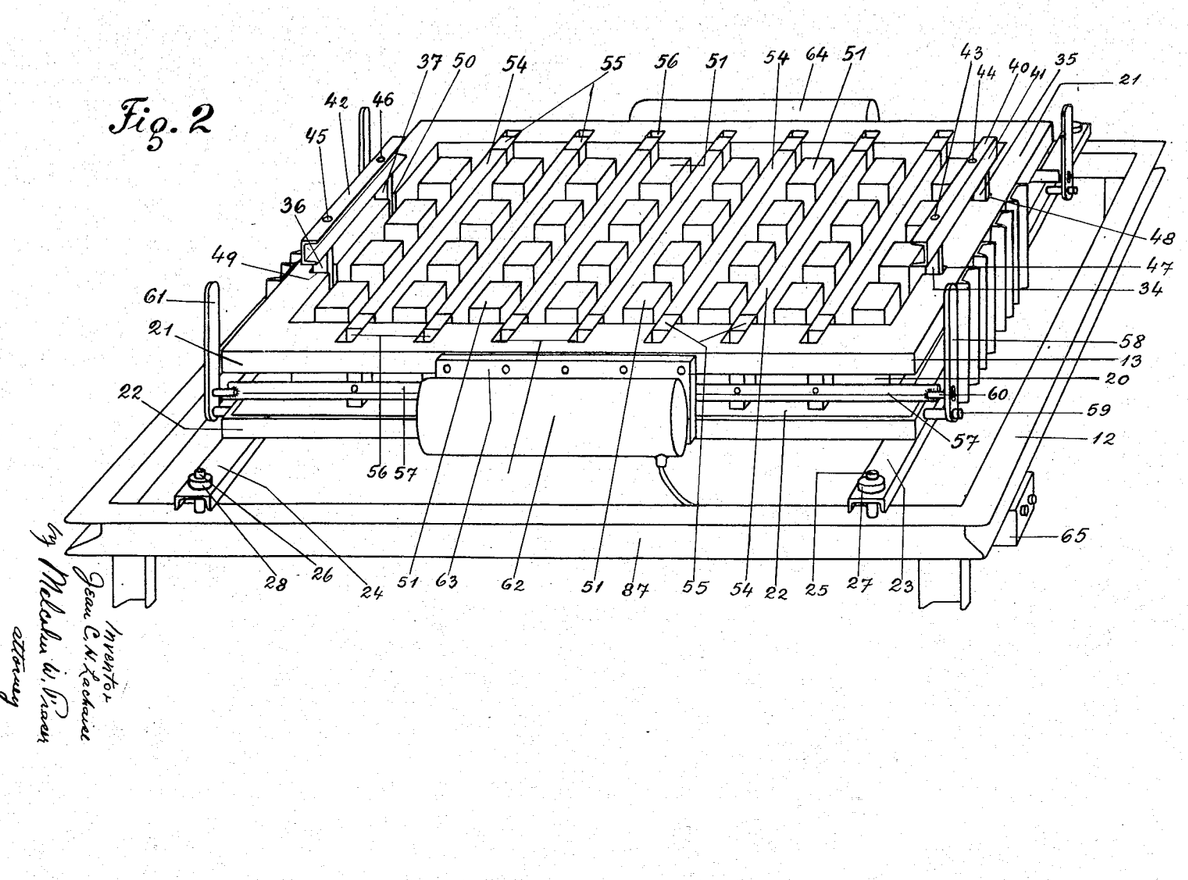
Fig. 2 is a perspective showing of a mold according to the invention.
Figure 3:
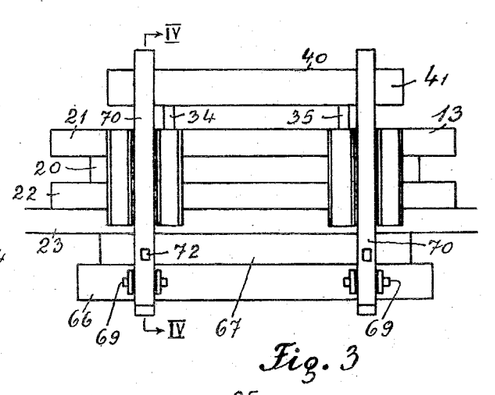
Fig. 3 is a side view of a particular form of the mold.
Figures 4, 6:
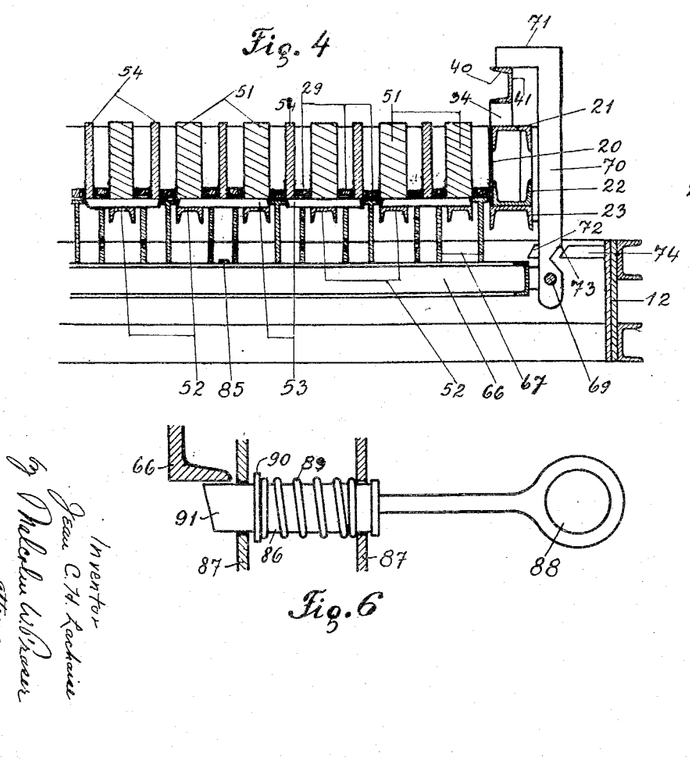
Fig. 4 is a longitudinal sectional part-view through line IV—IV of Fig. 3.
Fig. 6 is a detail view corresponding to Fig. 4.
Figure 8:
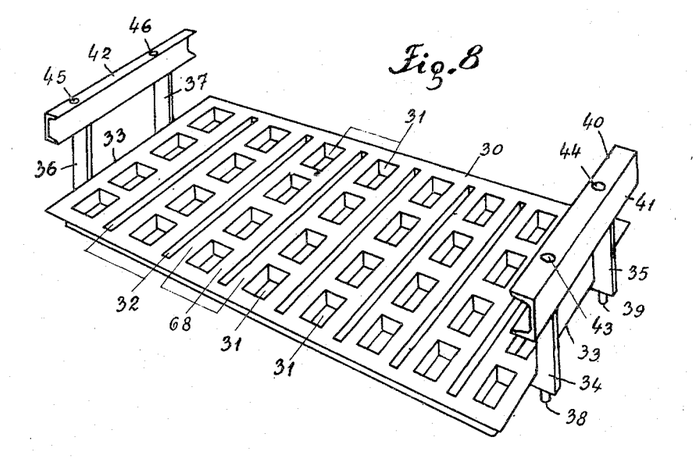
Fig. 8 is a perspective view of the multiple pallet.

Fig. 2 shows a mold for making hollow blocks, which is particularly suitable to be used in the plant according to the invention. Figs. 3, 4 and 8 show details thereof. The mold in question is constituted by a lateral wall 20, for example made of metal sheet, the height of which corresponds to that of the article to be manufactured. This metal sheet is reinforced by an upper band 21 and a lower band 22. In the embodiment shown, these bands are constituted by U-irons the bottoms of which are opposed to each other and which are in contact with the mold wall by their inner sides. The connection with this wall may be effected in any known manner, such for example as riveting or electric welding.

The lower band bears on sleepers 23, 24 secured thereto in any suitable manner. In their turn, the sleepers 23, 24 are mounted on the frame 12 preferably by means of bolts such as 25, 26 and silent-blocks 27, 28.

The bottom of this mold, which is a movable bottom, is constituted by a piece called pallet 29 (Fig. 4) which is more amply shown in Fig. 8. This pallet comprises a flat bottom 30 in which are made two series of openings. The first series is intended to form passages for the mold cores and the openings 31 constituting said passages have, of course, a shape which corresponds to the transversal section of said cores. As will be indicated hereinbelow, each series of cores corresponds to a molded article; the pallet 30 will, therefore, comprise as many series of openings 31 as there are the molded articles it is desired to manufacture simultaneously. Every series of openings 31 is separated from the next series by longitudinal slots 32 forming passage for plates described hereinbelow and intended to separate from one another the different articles simultaneously molded. Said bottom 30 may be obtained by being cut from a metal sheet of suitable thickness, when its dimensions are small; but it may also be a cast-iron piece; at any rate, it may be reinforced by ribs on its interior face.

To the shorter ends of the bottom 30 are secured, perpendicular thereto, on one end studs 34, 35 and on the other end studs 36, 37. These studs are provided on their lower ends with pins 38, 39 the role of which will be explained hereinbelow. The upper ends of studs 34, 35 are connected by a U-iron 40 the web 41 of which faces outwardly; equally, the studs 36, 37 are connected on their upper ends by a U-iron 42 disposed in the same manner as the iron 40. The upper side of U-iron 40 has two openings 43, 44 separated by a distance equal to that separating the pins 38, 39. The upper side of U-iron 42 has equally two openings 45, 46. The whole comprising the studs 34, 35 and U-iron 40 forms a kind of handle which jointly with the similar handle formed by the studs 36, 37 and U-iron 42 permits to raise the pallet 29 out of the mold.

In order to correctly lodge the pallet 29 in the mold, there are provided openings 47, 48, 49, 50 in the belts surrounding the mould and in the wall itself of the latter, so as to form passage for the studs 34, 35, 36, 37. The length of these studs is such that the U-irons 40 and 42 are but a little beyond the upper face of the molded article or articles.

Figure 5:
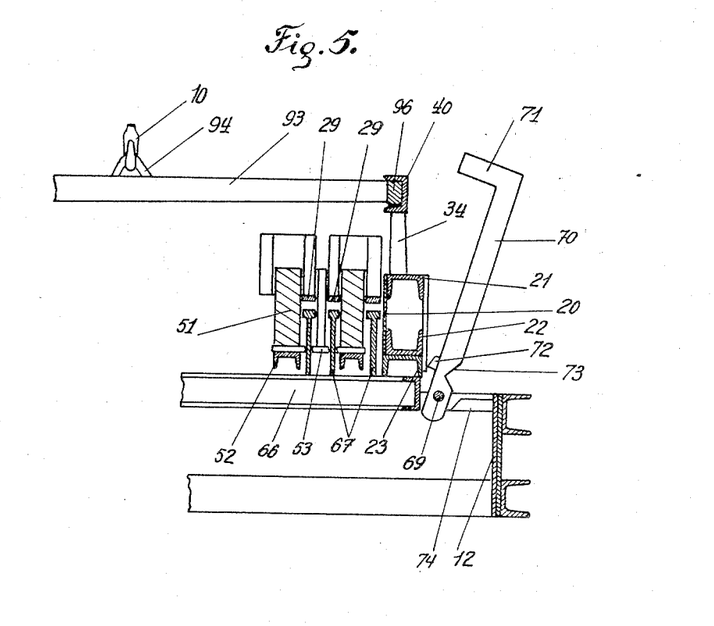
Fig. 5 is a sectional view corresponding to that of Fig. 4, showing the position of the parts at the mold discharge.

The mold according to the invention must, furthermore, comprise as many series of cores as there are the articles to be made simultaneously. As is shown in Fig. 2, 4 and 5, there are disposed within the mold as many series of cores such as 51 as there are the articles to manufacture. In the embodiment shown, the cores in question are supported by U-irons 52 secured to these cores in any known manner (Figs. 4 and 5). At their ends these irons 52 may be interconnected by means of flat irons 53 which, for the sake of clarity, are shown partly torn away (Fig. 4) while in reality they are continuous bodies.

It is, furthermore, indispensable to separate from one another the articles to be molded simultaneously. To this end, there are provided partitions 54 which separate the different series of cores 51. These partitions may be supported by the same U-irons 52 as the cores 51, each iron 52, so to speak, riding on a series of cores and a partition and, consequently, each partition and each series of cores riding on two irons 52. Each partition 54 may be also supported by an iron located at the same level as the irons 52 and connected thereto by irons 53.

As shown in Figs. 4 and 5, and as indicated in the above description of Fig. 8, the assembly formed by the cores 51 and partitions 54 are adapted to pass respectively through the openings 31 and 32 of the pallet 29, so that the whole, when mounted, has the aspect shown in Fig. 2.

However, because of the fact that the openings 32 evidently cannot be prolongated up to the outer edge of the pallet bottom 30, there exists a space between each partition end and the mold walls. If a molding operation was effected in these conditions, the articles simultaneously molded would be joined together by their two ends. To avoid this inconvenience, there are provided, according to the invention, movable auxiliary partitions 55 (Fig. 2). Such auxiliary partitions are disposed in the prolongation of each partition 54, one at each end. They may be displaced parallelly to themselves in lodgings 56 made in the mold wall 20 and in the bands 21, 22 thereof. These auxiliary partitions have the same height as the principal partitions 54 and their length is sufficient for enabling them to come in contact with the partitions 54 without completely leaving the corresponding lodgings 56. On the other part, the partitions 56 have a depth sufficient for enabling the partitions 55 to be entirely effaced without impeding the upward removal of the pallet 29.

In the embodiment shown in Fig. 2, all of the auxiliary partitions 55 are interconnected by an angle iron or a U-iron 57 enabling them to be simultaneously displaced. Such displacement may be effected for example by means of a lever 58. Such lever is at one of its ends pivotable about the axis 59 and is connected to the angle iron 57 through the medium of a pin 60. As it is readily comprehensible, handling of this lever permits to bring the auxiliary partitions 55 in contact with the principal partitions 54 or, on the contrary, to efface them in lodgings 56.

When the mold length exceeds a certain value, it may be advantageous to provide a double control at each end of the angle iron 57; this is what is shown in Fig. 2, such control being also effected by means of the lever 61 which is mounted similarly to the lever 58.

Obviously, the same control system, eventually also double, is provided for handling the auxiliary partitions situated on the opposite face of the mold.

There is, furthermore, provided a vibrator 62 secured on the belts 21 and 22 by its footing 63. When the dimensions of the mold or the nature of starting material so require, a second vibrator 64 may be provided on the opposed mold wall. The vibrator 62 is controlled by means of the box 65.

The mold just described permits to manufacture as many distinct articles as there are the series of cores therein, eight in number in the embodiment shown in Fig. 2. However, there is a difficulty when the mold dimensions exceed certain values. The removal of the pallet and molded articles supported thereby has a phase of separation which calls for a very important momentary effort increasing according to mold dimensions. After separation operation the effort corresponds only to the weight raised. But because of the fact that the working of a sole mold requires a great number of pallets out of action during the drying period, these pallets are of relatively light structure; thus when the separation effort is too important the bottom 30 tends to so deflect as to impede the discharge operation.

According to the invention, there is then provided a counter-pallet which is to accompany and to support the pallet during the short separation phase. It is to be mentioned that the travel of the counter-pallet is relatively very short, by reason of the rake of the cores.

Figs. 3, 4, 5 show an embodiment of the counter-pallet wherein 63 is a frame thereof substantially parallel to the pallet bottom 30. On this frame are mounted I-irons 67 which are adapted to bear against the solid portions 68 of the pallet (Fig. 8). This counter-pallet, being one in number for each mold, may, of course, be made as robust as may be desired. It accompanies and supports the pallet 29 during the separation phase. For this purpose, on each end of its longer sides there are pivoted in 69 vertical studs 70 formed to L whose upper legs 71 are adapted to contact the upper faces of the U-irons 40. At its lower end each stud has an adjustable inward abutment 72 and an outward inclined surface 73 adapted to cooperate with an abutment 74 secured to the frame 12. The operation and the role of the elements just described will be explained hereinbelow.

Figure 9:
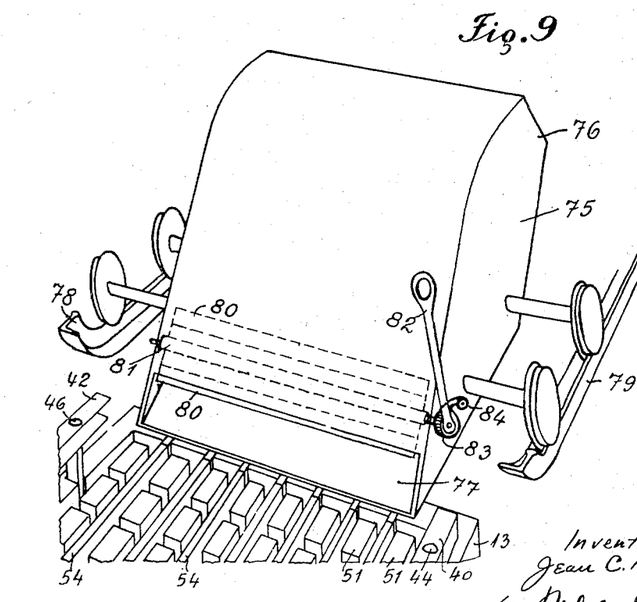
Fig. 9 is a perspective view of the doser.

The mold hereinabove described has, of course, to be filled up with material to be molded therein. The filling operation may be effected in any known manner. According to the invention, it is advantageous to perform such filling by means of the dosing device shown in Fig. 8. This doser comprises a container 75 whose capacity may be sufficient, for example, to contain all the quantity of concrete prepared by a single operation of the mixing machine 16. The container 75 has at its top an opening 76 for the introduction of concrete and at its bottom an opening 77. This container 75 has a width substantially equal to the longitudinal dimension of the mold, as shown in Fig. 9. This container 75 may be displaced on rails 78, 79 so as to reach the front end of the mold as clearly shown in Fig. 1. Within the container 75, in the vicinity of its bottom opening 77, there is disposed the very doser. This doser is constituted by blades 80, for example four in number, mounted on a shaft 81; preferably, these blades obstruct the opening 77. The shaft 81 is rotatably driven by the lever 82, through the medium of the ratchet wheel 83 and pawl 84. By each displacement of the lever 82 there is, therefore, ejected a quantity of concrete corresponding to the volume comprised between two successive blades. In this way, only the necessary quantity of material may be readily introduced into the mold.

The operation of the plant just described is as follows:

The mold 13 is first put in order, that is to say that, the cores and the partitions being in their operative position, a pallet 29 is introduced thereinto. At the time of the preceding removal of the pallet, the counter-pallet (Fig. 5) has been raised and maintained in its raised position by the device 85 more amply shown in Fig. 6. This device substantially comprises a rod 86 traversing the stud 87 of frame 12 and protruding into the interior, a handle 88 being provided on its outer end. This rod 86 is tended towards the mold interior by a spring 89 bearing on the washer 90, the inner end of this rod being bevelled as in 91.

Figure 7:
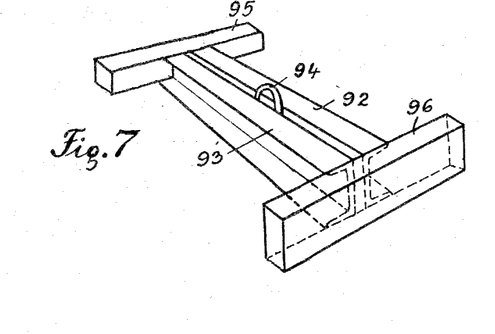
Fig. 7 is a perspective view of the hoisting member.

The pallet 29 being in place, the operator pulls the handle 88, whereby the pallet and the counter-pallet whose bottom 66 was bearing on the rod 86, descend simultaneously to their operative positions. In the course of this downward movement, the inclined face 73 meets the abutment 74 fast to the frame, so that the studs 70 which, as will be explained hereinbelow, have been thrust away from the mold, are brought back towards the mold and their legs 71 come in contact with the U-irons 40. By suitably handling the levers 58 and 61, the auxiliary partitions 55 are brought back in contact with the partitions 54. Thereafter, the vibrator or vibrators 62, 64 are set in action. Concrete prepared in the mixing machine 16 and discharged into the container 75 is then, by handling the lever 82 and the blades 80, introduced in right quantity into the mold. The molding operation being terminated, the traveling bridge is brought over the mold and the hoisting member is introduced into the U-irons 40, 42. This hoisting member, more amply shown in Fig. 7, is constituted by two U-irons 92 and 93 carrying a ring jammed in therebetween and adapted to be hooked up by the hoisting hook 10 of the bridge (Fig. 1). Two slide-bars 95 and 96 are made integral with the ends of irons 92 and 93; it is these slide-bars that are introduced into the hollows of irons 40, 42 (Fig. 5).

Both the pallet and counter-pallet are, therefore raised by setting the bridge in motion, the counter-pallet having for its object to ensure that the separation phase be effected without the pallet being deflected. After a very short time, the abutment 72 comes in contact with U-iron 23 whereby the studs 70 are thrust away from the mold and the legs 71 abandon the U-irons 40, 42. In the course of this movement, the bottom 66 of counter-pallet passes over the face 91 of abutment 86. From this instant, the pallet alone continues its upward movement, while the counter-pallet falls back on the abutment 86 by which it is maintained in the air (Fig. 5).

The traveling bridge 1 then transports the pallet with its molded articles to a drying place. The pallet then may be placed on top of a preceding pallet, the pins 38, 39 penetrating into the openings such as 43, 44, 45, 46 made in the handles of the preceding pallet or pallets. The two pallets thus superposed then form a relatively solid assembly, and a certain number of pallets may be superposed thereupon in the same manner. Such disposition, therefore, permits a considerable economy in the matter of space required for the drying of the molded articles. In opposition thereto, such disposition, as pointed out hereinabove, necessitates a great number of pallets.

In the very course of the transportation just described an available pallet is introduced into the mold so as to bear on the elements 67 of counter-pallet which has been maintained in its raised position by the abutment 86. When the pallet is thus placed, the said abutment is withdrawn by the handle 88 being pulled upon, and the assembly comprising both the pallet and counter-pallet descends again to retake its operative position. In the course of this downward movement, the inclined face 73 of stud 70 contacts the stationary abutment 74, whereby the stud 70 is brought back towards the mold interior and its leg 71 tops again the U-iron serving as handle for the pallet.

By suitably handling the levers 58, the auxiliary partitions 55 are brought in contact with the properly called partitions 54 (Fig. 2), so that the mold is ready for its next operation.

Figure 10:
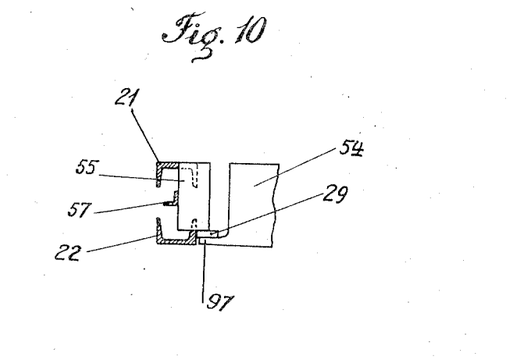
Fig. 10 is a sectional part-view of a modification.

It is to be understood that the invention is not limited to the embodiments described and shown, for modifications of detail may be made therein without departing from the scope thereof. Thus, the mold may have a solid bottom on which the cores and the partitions would be secure. It is, further, possible to mount the cores on U-irons, as described hereinabove, and render the partitions fast to the lateral walls of the mold at their lower ends, for example in 97 (Fig. 10), by means of electric welding. As to the doser, this may be displaced on stationary rails by any suitable means or be mounted stationarily at the ends of movable arms. Besides, there may be provided a second transportation member intended to take the pallets at the drying place, when the molded articles are dried, and transport them to the storage place where the articles are discharged, and then bring the empty pallet back to the mold for a subsequent operation.

What I claim is:

1. A mold for the production of building members comprising mold walls, a plurality of parallel rows of cores and partitions between said rows in fixed spatial relationship with respect to the mold wall, a secondary frame including a number of interconnected channel irons to which the cores and partitions are rigidly secured, an independent pallet vertically movable with respect to said mold walls and provided with apertures and slots adapted to engage respectively the cores and partitions and forming the mold body with the mold wall and said cores and partitions, a counter pallet adapted to move within the predetermined limits vertically with reference to the pallet and including a frame and protruding members adapted to be fitted between the channel irons of the secondary frame for contact with the solid portion of the apertured pallet.

2. A mold for the production of building members comprising mold walls, a plurality of parallel rows of cores and partitions between said rows in fixed spatial relationship with respect to the mold wall, a secondary frame including a number of interconnected channel irons to which the cores and partitions are rigidly secured, an independent pallet vertically movable with respect to said mold walls and provided with apertures and slots adapted to engage respectively the cores and partitions and forming the mold body with the mold wall and said cores and partitions, a counter pallet adapted to move within predetermined limits vertically with reference to the pallet and including a frame and protruding members adapted to be fitted between the channel irons of the secondary frame for contact with the solid portion of the apertured pallet, handles rigid with two opposed sides of the pallets, uprights pivotally secured to the frame of the counter-pallet and including a flange at its upper end adapted to top the corresponding handle of the pallet for clamping the said pallet and counter-pallet vertically together and means for disconnecting the pallet and counter pallet after the molding operation is at an end.

3. A mold for the production of building members comprising mold walls, a plurality of parallel rows of cores and partitions between said rows in fixed spatial relationship with respect to the mold wall, a secondary frame including a number of interconnected channel irons, to which the cores and partitions are rigidly secured, an independent pallet vertically movable with respect to said mold walls and provided with apertures and slots adapted to engage respectively the cores and partitions and forming the mold body with the mold wall and said cores and partitions, a counter-pallet adapted to move within predetermined limits vertically with reference to the pallet and including a frame and protruding members adapted to be fitted between the channel irons of the secondary frame for contact with the solid portion of the apertured pallet, handles rigid with two opposed sides of the pallets, uprights pivotally secured to the frame of the counter-pallet and including a flange at its upper end adapted to top the corresponding handle of the pallet for clamping the said pallet and counter-pallet vertically together, an adjustable abutment carried by each upright, stationary abutments rigid with the molding wall and adapted to cooperate with the corresponding adjustable abutment during the vertical movement of the pallet for swinging the corresponding upright round its pivotal axis and disconnecting thereby the handles from the uprights and means for reconnecting said handles and uprights for subsequent operation.

4. A mold for the production of building members comprising mold walls, a plurality of parallel rows of cores and partitions between said rows in fixed spatial relationship with respect to the mold wall, a secondary frame including a number of interconnected channel irons, to which the cores and partitions are rigidly secured, an independent pallet vertically movable with respect to said mold walls and provided with apertures and slots adapted to engage respectively the cores and partitions and forming the mold body with the mold wall and said cores and partitions, a counter-pallet adapted to move within predetermined limits vertically with reference to the pallet and including a frame and protruding members adapted to be fitted between the channel irons of the secondary frame for contact with the solid portion of the apertured pallet and handles rigid with two opposed sides of the pallets, uprights pivotally secured to the frame of the counter-pallet and including a flange at its upper end adapted to top the corresponding handle of the pallet for clamping the said pallet and counter-pallet vertically together, an adjustable abutment carried by each upright, stationary abutments rigid with the molding wall and adapted to cooperate with the corresponding adjustable abutment during the vertical movement of the pallet for swinging the corresponding upright round its pivotal axis and disconnecting thereby the handles from the uprights and further cooperating abutments on each upright and molding wall and adapted to swing the upright back during the return movement of the pallet.

5. A mold for the production of building members comprising mold walls, a plurality of parallel rows of cores and partitions between said rows in fixed spatial relationship with respect to the mold wall, an independent pallet vertically movable with respect to said mold walls and provided with apertures and slots adapted to engage respectively the cores and partitions and forming the mold body with the mold wall and said cores and partitions, auxiliary partitions adapted to be inserted in alignment between each end of each partition and the longitudinal side of the mold wall facing said end and adapted to collapse into a receded position and common control means for all the auxiliary partitions corresponding to one longitudinal side of the molding wall.

6. A mold for the production of building members comprising mold walls, a plurality of parallel rows of cores and partitions between said rows in fixed spatial relationship with respect to the mold wall, an independent pallet vertically movable with respect to said mold walls and provided with apertures and slots adapted to engage respectively the cores and partitions and forming the mold body with the mold wall and said cores and partitions, auxiliary partitions adapted to be inserted in alignment between each end of each partition and the longitudinal side of the mold wall facing said end and adapted to collapse into a receded position and a movable member at right angles with the plane of and rigid with said auxiliary partitions corresponding to one longitudinal side of the mold wall, a lever pivotally secured to each longitudinal mold wall side and controlling the corresponding movable member for simultaneously shifting the corresponding auxiliary partitions.

7. A mold for the production of building members comprising mold walls, a plurality of parallel rows of cores and partitions between said rows in fixed spatial relationship with respect to the mold wall, an independent pallet vertically movable with respect to said mold walls and provided with apertures and slots adapted to engage respectively the cores and partitions and forming the mold body with the mold wall and said cores and partitions, auxiliary partitions adapted to be inserted in alignment between each end of each partition and the longitudinal side of the mold wall facing said end and adapted to collapse into a receded position and a movable member at right angles with the plane of and rigid with auxiliary partitions corresponding to one longitudinal side of the mold wall, a lever pivotally secured to each longitudinal mold wall side and controlling the corresponding movable member for simultaneously shifting the corresponding auxiliary partitions and at least one vibrator rigid with the mold wall.

JEAN CÉLESTIN HIPPOLYTE LACHAISE.

REFERENCES CITED

The following references are of record in the file of this patent:

UNITED STATES PATENTS

| Number | Name | Date |
|---|---|---|
| 812,123 | Forbes | Feb. 6, 1906 |
| 1,625,762 | Barrymore | Apr. 19, 1927 |
| 1,687,010 | Flam | Oct. 9, 1928 |
| 1,749,213 | Flam | Mar. 4, 1930 |
| 1,878,957 | Martin | Sept. 20, 1932 |
| 1,920,716 | Schafer | Aug. 1, 1933 |
| 2,006,594 | Hoch | July 2, 1935 |
| 2,131,474 | Henderson | Sept. 27, 1938 |